United States Patent

Melead

[11] 3,878,014
[45] Apr. 15, 1975

[54] PROCESS FOR MATTING MELT BLOW MICROFIBERS

[75] Inventor: James J. Melead, Roscoe, Ill.

[73] Assignee: Beloit Corporation, Beloit, Wis.

[22] Filed: Apr. 30, 1973

[21] Appl. No.: 355,901

[52] U.S. Cl. ............... 156/167; 156/178; 156/285
[51] Int. Cl. ............................................ D04h 3/16
[58] Field of Search ........... 156/167, 176, 177, 178, 156/181, 229, 285, 312, 436, 500, 498, 279; 65/9, 12; 264/176 F, 210 F

[56] References Cited
UNITED STATES PATENTS

| | | | |
|---|---|---|---|
| 3,509,009 | 4/1970 | Hartmann | 161/150 |
| 3,554,854 | 1/1971 | Hartmann | 161/150 |
| 3,607,543 | 9/1971 | Stevenson et al. | 161/150 |
| 3,676,242 | 7/1972 | Prentice | 156/297 |
| 3,676,243 | 7/1972 | Sasshofer et al. | 156/181 |
| 3,676,244 | 7/1972 | Kim | 156/181 |
| 3,738,894 | 6/1973 | Lipscomb et al. | 156/167 |
| 3,738,897 | 6/1973 | Bianchini | 156/498 |
| 3,755,527 | 8/1973 | Keller et al. | 156/167 |

*Primary Examiner*—Douglas J. Drummond
*Assistant Examiner*—Neal Kalishman
*Attorney, Agent, or Firm*—Hill, Gross, Simpson, Van Santen, Steadman, Chiara & Simpson

[57] ABSTRACT

An improved process for making a laminar structure of a non-woven mat of melt-blown microfibers and a pre-formed porous web. The process involves laying down upon a pre-formed moving web a layer of melt blown microfibers. The web is then moved over the zone where sub-atmospheric pressures are maintained and then subsequently over a zone where super-atmospheric pressures are maintained. The process enables one to produce a laminant incorporating a layer of melt blown microfibers by using applied pressures to regulate microfiber mat thickness and to bond same to an adjoining web.

5 Claims, 2 Drawing Figures

PROCESS FOR MATTING MELT BLOW MICROFIBERS

BACKGROUND OF THE INVENTION

The art of making a non-woven mat of melt blown micro-fibers of thermoplastic polymer, has heretofore utilized suction and/or pressure rollers to bond a mat of microfibers to a substrate and achieve a mat product of predetermined thickness.

Characteristically, such a process has involved bulky equipment and the pressures mechanically applied to a mat surface have sometimes produced an undesirable compacting and densification of the melt blown microfibers.

SUMMARY OF THE INVENTION

The present invention aims at producing efficiently and economically laminate of a mat of melt blown microfibers with a porous preformed web utilizing simple apparatus and process conditions.

By this invention the degree of bonding between mat and web, and the bulk density of the mat, can be closely controlled, so that a laminate having a light bonding and a maximum bulk density is producable. These products have many desirable features and applications.

The invention avoids the cumbersome screen arrangements heretofore associated with the manufacture of laminates incorporating melt blown microfibers.

The present invention will be further illustrated by the following specific examples which are given by way of illustration and not as limitations on the scope of the present invention.

Other and further pruposes, objects and advantages will be apparent to those skilled in this art from a reading of the present specification taken with the drawings.

DETAILED DESCRIPTION

Figure 1:
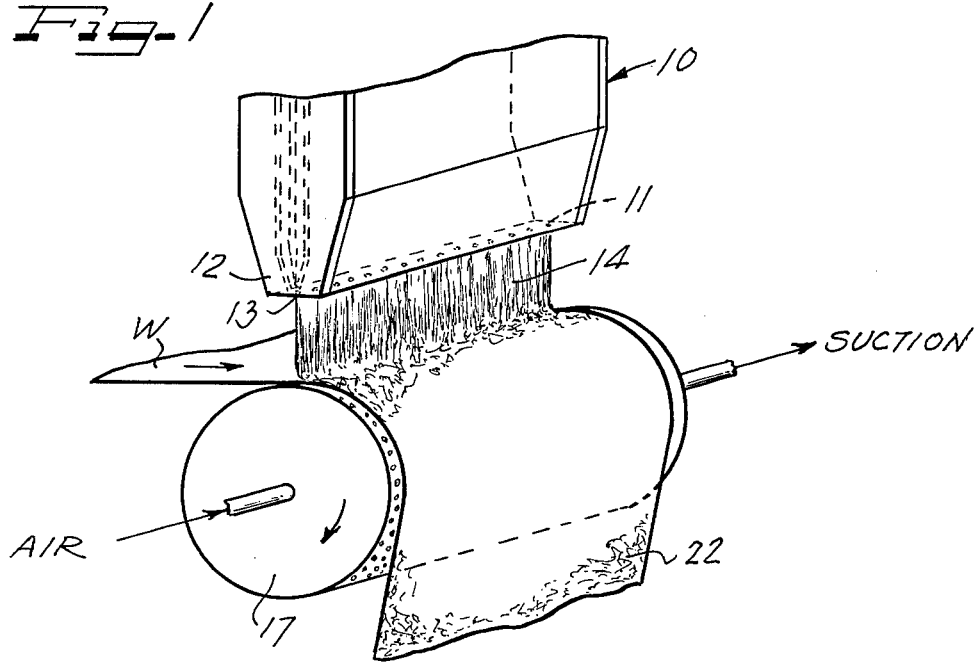
FIG. 1 is a schematic isometric view of a laminate forming operation of this invention, wherein a preformed non-woven web is laminated against a mat of melt blown microfibers, in accordance with the teachings of this invention.

Referring to FIG. 1, a thermoplastic resin is heated and forced in molten form through die head 10. A preferred resin is a polyolefin, such as polypropylene. When polypropylene is employed it is heated initially to temperatures in excess of about 600°F. to about 900°F., and preferably in the range of 600° to 800°F., after which the polypropylene is extruded through the die head 10.

Die head 10 contains a row of die openings 11 which may contain heating plates if desired (not shown). The heated resin exits from die openings 11 into a gas stream which is produced from gas slots 12 and 13 on either side of the die head 10. The hot air or gas stream functions to attenuate the molten extruded resin strands into fibers, essentially in a plane 14 which continuously moves away from the die openings 11. Beneath die head 10 is positioned a moving web of porous material, such as paper, preformed porous plastic film, or a previously formed mat of melt blown fibers or the like. The attenuated fibers in plane 14 are collected on the web 16 which is continuously advancing across the plane 14. The web 16 is tensioned circumferentially from about 60° to 150° of the circumferential surface of the drum 17 (preferably about 90°). The circumferential surface of drum 17 is perforated in the manner of a screen; drum 17 itself may be revolvable or stationary.

As the web 16 moves under the plane 14, a mat 24 of melt blown microfibers is laid down thereonto. As the web 16 continues to progress forwardly on the surface of the drum 17, it moves over a stationary first zone or chamber 18 wherein sub-atmospheric pressures are maintained. These pressures are applied against the other face of the web 16 from that on which the melt blown fibers are applied, and the effect is to draw air at initially ambient temperatures uniformly through the matrix of newly formed mat 24 and preformed web 16. Simultaneously, the web 16 is supported on the rigid, perforated or screened, circumferential surface of the drum 17. The effect is both to draw down melt blown fibers against the web 16 and to fuse such to web 16, all while such melt blown fibers are in a heated condition.

The longitudinal distance measured circumferentially on the surface of drum 17 of the first zone 18, the rate at which the web 16 is moving over first zone 18, the rate at which air passes through the web 16 in zone 18 as respects the circumferential surface of drum 17, and the initial temperature of the fibers from plane 14 at the time of contacting mat 16 are each so adjusted that the result is to produce a composite 22 of mat 24 and web 16 at the end of zone 18 which achieves a predetermined reduced total thickness at the end of first zone 18 relative to the thickness of the composite 22 at the beginning of this first zone 18.

As web 16 continues to progress around the circumferential surface of drum 17, it moves over a second zone 21 where super-atmospheric pressures are applied against the adjacent, exposed face of the web 16. Simultaneously the web 16 continues to be tensioned about a wind-up roller, such as a roller 19. The second zone or region 21, like zone or region 18, thus has air passing therethrough, but in a reverse direction from the direction associated with air flow in zone 18. As in the case of zone 18, however, air flow through the circumferential surface of drum 17 is initially at ambient temperatures.

The longitudinal distance measured circumferentially on the surface of drum 17 of the second zone 21, the rate at which the web 16 traverses or moves over such second zone 21, the rate of air passage through the web 16 as it passes over zone 21, and the temperature of the fiber mat deposited on the web 16 at the end of zone 21 are each so adjusted that the result is to produce a composite of web 16 and mat at the end of such second zone 21 which achieves a predetermined reduced temperature relative to the temperature of such composite at the end of the first zone 18 (or at the beginning of second zone 21). This reduced temperature is usually chosen so as to be below the glass transition temperature of the fibers forming the mat in a produce composite 22.

Depending upon the conditions used in melt blowing the resin, and the conditions used in the respective zones 18 and 21, the resulting non-woven laminated structure 22 may have fibers which vary in diameter from about 1 to 30 microns in the mat 24 portion thereof. The wide range of properties achievable in product laminates 22 make them suitable for a variety of end uses and applications as those skilled in the art will readily appreciate; see, for example, U.S. Pat. No. 3,676,242.

Although process conditions can vary widely without departing from the spirit and scope of this invention when using, for example, polypropylene melt blown fibers, the longitudinal distance of the first zone 18 typically ranges from about ½ to 3 feet the rate at which the web 16 moves circumferentially about the surface of drum 17 typically ranges from about 100 to 1,000 feet per minute, the typical pressures employed at the circumferential surface of the first zone 18 beneath web 16 from about −¾ to −3 psi (pounds per square inch), and the typical temperatures of fibers forming the mat 24 at the time of contacting web 16 range from about 600° to 180°F. and at the end of the first zone 18 range from about 300° to 110°F. Typical web thicknesses range from about 15 to 100 microns, while typical mat thicknesses at the end of the first zone 18 range from about 15 to 100 microns, the latter thickness representing also about the thickness of the mat 24 in a final cooled product produced in accordance with the teachings of the present invention. Similarly, for polypropylene melt blown fibers.

In the second zone 21, the characteristic longitudinal, distance thereof is typically in the range from about ½ to 3 feet, the rate of the web 16 movement over this zone 21 is substantially identical to that employed over the first zone 18, and the pressure maintained at the circumferential surface of the second zone 21 beneath web 16 is typically in the range from about ¼ to 4 psi. At the end of the second zone 21, the typical temperatures associated with a product composite laminate 22 range from about 120° to 80°F. as compared to temperatures in the range from about 300° to 110°F for a composite 22 at the start of the second zone 21.

In utilizing the foregoing conditions one selects a web 16 which is formed of a material which melts and preferably softens at a higher temperature than that associated with polypropylene, and a web 16 which has a tensile strength sufficient to withstand the stresses exerted thereon during the practice of the process of the present invention. Preferably the melt blown fibers, whether in a web or in a mat as used in this invention have diameters from about 1 to 30 microns.

EMBODIMENTS

The present invention is further illustrated by reference to the following examples. Those skilled in the art will appreciate that other and further embodiments are obvious and within the spirit and scope of this invention from the teachings of these present examples taken with the accompanying specification and drawings. All parts are parts by weight, unless otherwise indicated.

EXAMPLE 1

Figure 2:
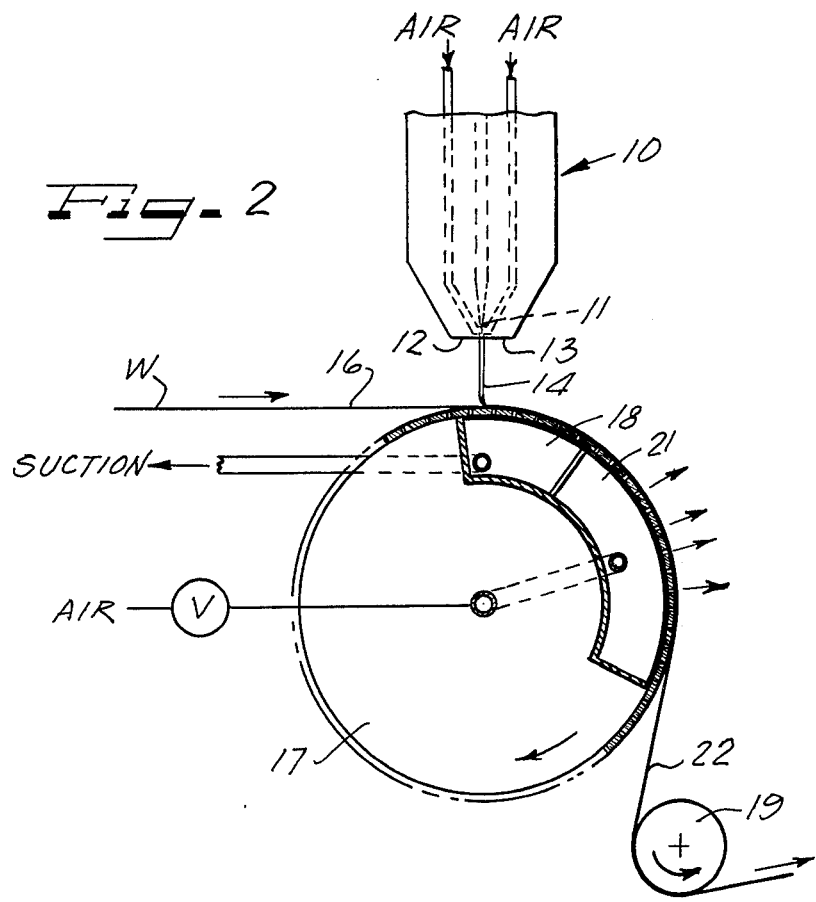
FIG. 2 is a vertical sectional view transversely taken through the apparatus shown in FIG. 1.

Polypropylene is extruded through a melt-blowing die of the type shown in FIGS. 1 and 2. Each die orifice is about 0.4 mm in cross-section. The fiber strands issuing from this die are struck with streams of hot air as shown in FIG. 1 to fibers which have average diameters under about 20 microns and average lengths of a few inches each. These fibers are compacted into a planar configuration by the air streams and this configuration is allowed to impact perpendicularly against a moving, preformed porous web of kraft paper having a thickness of about 100 microns and attenuate these fiber strands moving transversly relative to the planar configuration of such melt blown fibers in the planar configuration at the time of impact against the web as estimated to be about 400°F.

The web/mat system 22 moves over the first zone where the pressures exerted on the web are about −1.5 psi. The longitudinal, circumferential length of the first zone is about 1.0 feet.

At the end of the first zone, the web/mat laminate 22 has a thickness of about 30 microns and its surface temperature is of about 190°F.

This composite 22 immediately moves forward at the same speed over the second zone 22 wherein the air pressure on the web is maintained at about 1.3 psi. The longitudinal, circumferential distance of this zone is about 1.2 feet.

At the end of the second zone, the web/mat laminate 22 has its thickness substantially unchanged and has a surface temperature of about 90°F.

EXAMPLE 2

Example 1 is repeated using a preformed porous polypropylene web formed of melt blown fibers.

I claim:

1. A process for making a non-woven laminar structure of melt-blown microfibers on a pre-formed porous web comprising the steps of continuously passing a non-woven web under tension over a suction zone and then a pressure zone and supporting the web while passing over said zones, providing a die head having a row of die openings therein for the passage of hot gas to attenuate molten, extruded resin as fibers to the suction zone, extruding molten thermoplastic resin through said die openings in the die head and simultaneously passing a stream of hot gas immediately above and below said row of die openings to attenuate the molten, extruded resin as fibers extending generally perpendicular to the plane of the web, drawing air at ambient temperatures uniformly through the web in the suction zone while simultaneously supporting the web, then forcing air through the web at predetermined temperatures so adjusted as to achieve a composite matlike form at a reduced temperature relative to the temperature of passage of the web over the first zone and below the glass transition temperature of the fibers.

2. The process of claim 1, wherein the mat comprises polypropylene.

3. The process of claim 1, wherein the web comprises kraft paper.

4. The process of claim 1, wherein the melt-blown microfibers comprise polypropylene and the mat comprises kraft paper.

5. The process of claim 4, in which the melt-blown fibers have a diameter from 1 to about 30 microns.

* * * * *